United States Patent
Everaerts et al.

(10) Patent No.: US 6,806,320 B2
(45) Date of Patent: Oct. 19, 2004

(54) BLOCK COPOLYMER MELT-PROCESSABLE COMPOSITIONS, METHODS OF THEIR PREPARATION, AND ARTICLES THEREFROM

(75) Inventors: Albert I. Everaerts, Oakdale, MN (US); JingJing Ma, Woodbury, MN (US); Ashish K. Khandpur, Lake Elmo, MN (US); Francois C. D'Haese, Wichelen (BE); Jianhui Xia, Woodbury, MN (US); Lang N. Nguyen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 4 days.

(21) Appl. No.: 10/295,810

(22) Filed: Nov. 15, 2002

(65) Prior Publication Data

US 2004/0097658 A1 May 20, 2004

(51) Int. Cl.$^7$ ............................ C08F 20/10; C08L 31/02
(52) U.S. Cl. .................... 525/330.3; 525/221; 525/301; 525/75; 525/78; 525/80; 525/85; 525/191; 525/222; 525/227; 525/299
(58) Field of Search ............................ 525/330.3, 221, 525/222, 227, 299, 301, 75, 78, 80, 85, 191

(56) References Cited

U.S. PATENT DOCUMENTS

| | | | |
|---|---|---|---|
| 4,336,345 A | 6/1982 | Lewis et al. | |
| 5,395,884 A | 3/1995 | Gnanou | |
| 5,648,425 A | 7/1997 | Everaerts et al. | |
| 5,677,387 A | 10/1997 | Bayard et al. | |
| 5,686,534 A | 11/1997 | Bayard et al. | |
| 5,763,548 A | 6/1998 | Matyjaszewski et al. | |
| 5,807,937 A | 9/1998 | Matyjaszewski et al. | |
| 6,503,620 B1 * | 1/2003 | Xie et al. | 428/354 |
| 6,663,855 B2 * | 12/2003 | Frechet et al. | 424/70.11 |
| 2002/0161129 A1 | 10/2002 | Husemann et al. | |
| 2003/0114582 A1 | 6/2003 | Husemann et al. | |

FOREIGN PATENT DOCUMENTS

| | | |
|---|---|---|
| EP | 0 349 270 B1 | 8/1994 |
| EP | 0 921 170 A1 | 6/1999 |
| EP | 1 094 086 A1 | 4/2001 |
| EP | 1 234 864 A2 | 8/2002 |
| JP | 9-324165 | 12/1997 |
| JP | 10-8011 | 1/1998 |
| JP | 10-8012 | 1/1998 |
| JP | 10-8013 | 1/1998 |
| JP | 10-25459 | 1/1998 |
| JP | 10-25460 | 1/1998 |
| JP | 10-30078 | 2/1998 |
| WO | WO 97/18247 A1 | 5/1997 |
| WO | WO 00/39233 A1 | 7/2000 |
| WO | WO 01/60912 A2 | 8/2001 |

OTHER PUBLICATIONS

ASTM D3330–90, Standard Test Methods for Peel Adhesion of Pressure–Sensitive Tape at 180° Angle.
ASTM 3654–88, Standard Test Method for Holding power of Pressure–Sensitive Tapes.

* cited by examiner

Primary Examiner—James J. Seidleck
Assistant Examiner—Olga Asinovsky
(74) Attorney, Agent, or Firm—Lisa P. Fulton

(57) ABSTRACT

Described are melt-processable block copolymers and compositions, embodiments of which may be useful in applications such as pressure sensitive adhesive (PSA) or heat-activatable adhesive, comprising polymeric end block and polymeric B block, wherein end block comprises copolymer and the B block comprises homopolymer or copolymer.

27 Claims, 1 Drawing Sheet

US 6,806,320 B2

BLOCK COPOLYMER MELT-PROCESSABLE COMPOSITIONS, METHODS OF THEIR PREPARATION, AND ARTICLES THEREFROM

FIELD OF THE INVENTION

The present invention relates to block copolymer melt-processable compositions such as adhesives, pressure sensitive adhesives, sealants, elastomers, other hot melt processable compositions, to methods of their preparation, and to articles having a coating of such a composition applied thereto.

BACKGROUND

Among adhesive chemistries, poly(meth)acrylates (e.g., polymers derived at least in part from one or more methacrylate monomer or acrylate monomer) are one of the most prominent. (Meth)acrylates have evolved as a preferred class of adhesives due to their durability, permanence of properties over time, and versatility of adhesion, to name just a few of their benefits.

Traditionally, adhesives such as (meth)acrylates have been provided in organic solvent for processing, application, or other incorporation into a larger product. Solvent based adhesives can be applied to a substrate and the solvent can be removed, leaving behind the adhesive.

Hot-melt adhesives advantageously reduce or eliminate the use of organic solvents in adhesives and their processing. Hot-melt adhesive systems are essentially 100% solid systems. Usually, such systems contain no more than about 5% organic solvent or water, more typically no more than about 3% organic solvent or water. Most preferably, such systems are free of organic solvent and water. Advantageously, by reducing the use of organic solvents, special handling concerns associated with the use of organic solvents are also reduced.

Melt-processable block copolymer materials have been prepared, as described in PCT International Publication Number WO 00/39233. These block copolymers are described as generally contemplated to include homopolymer or copolymer blocks. According to this publication and other prior art techniques, to provide a block copolymer with melt-processing capability, the molecular weight of homopolymer end blocks may be relatively low. The relatively low molecular weight of the end blocks can still allow for useful and acceptable cohesive strength, but the ability to use relatively higher molecular weight end blocks, without losing melt-processing capabilities, could be advantageous by further improving other properties of a block copolymer composition such as cohesive strength.

SUMMARY

Block copolymers contain at least two different polymeric "blocks" that cause the bulk block copolymer to exhibit desired properties. (The term "block copolymer" is used herein to describe a block copolymer on a molecular scale, and also for convenience to reference a block copolymer-containing composition or "bulk" block copolymer). Typically, one block, the end block or "A" block, is a relatively high glass transition temperature polymeric block that provides structural and cohesive strength within use temperature ranges. The "B" block or blocks, which may typically constitute the middle or core of the block copolymer, have a relatively lower glass transition temperature and provide elastomeric properties. The chemistry of the B block can also affect properties of the block copolymer composition including glass transition temperature and modulus, which relate to tackiness of the composition.

The polymeric blocks interact with each other in a bulk composition differently at different temperatures, providing useful temperature-controlled properties. At low temperatures, e.g., use temperatures, e.g., temperatures below the glass transition temperature of the end A blocks and above the glass transition temperature of the B blocks (e.g., for pressure sensitive adhesive and elastomer compositions, typically below 100° C. and above −50° C.), the different blocks organize into ordered A and B phases, or "phase separate," within the bulk block copolymer composition. For compositions containing less than about 50 weight % of the A block, typically microdomains of discontinuous A block are formed within a continuous phase of B block. The A domains provide rigidity and strength within the lower modulus continuous B phase, for a desirable combination of properties. At higher temperatures, e.g., at a temperature greater than the Tg of an A block, e.g., greater than 100° C. to about 200° C., the bulk block copolymer can be melt processed. In a favorably designed block copolymer, the thermal energy imparted to the bulk block copolymer at these temperatures is sufficient to disrupt the ordered multiphase morphology and create disorder within the block copolymer composition. The disordered composition does not retain the strength of the ordered microdomains and as a result can flow and be "melt processed" relatively easily— melt-processable block copolymer compositions have a viscosity upon melting that allows the compositions to be melt-processed (e.g., applied to a substrate). Upon cooling, the composition returns to the ordered, strengthened, multiphase morphology.

FIG. 2 illustrates thermal behavior of a block copolymer of Example 1 over a range of temperatures such that the different regions of block copolymer viscoelastic behavior could be accessed. G' (storage modulus), G" (loss modulus), and tan ∫ (the ratio G"/G') are plotted in the figure as a function of temperature. These dynamic mechanical measurements were conducted using a rheometer in a shear geometry. At very low temperatures (<−50° C.), the entire block copolymer is in a glassy state and the material is predominantly elastic (G'>>G"). A precipitous drop is observed in G' over a temperature range (ca. −50° C. to ca. −10° C.) and a peak in tan $\partial$ is observed which is associated with the Tg of the B block. A plateau in G' is observed from ca. 0° C. to ca. 100° C. and is attributed to the entanglements of the B block polymer chains. Above ca. 100° C., G' starts dropping sharply due to the onset of flow in the system and as the Tg of the A block is exceeded. Accordingly, the viscoelastic response is dominated by G" in this flow region (G">G') and a steep increase in tan $\partial$ (=G'/G') is observed. It is in this "flow region" of the viscoelastic curve that melt processing is often conducted.

The temperature at which meltflow occurs is referred to herein as the meltflow temperature. One convenient measurement of meltflow temperature that can be used for purposes of this description is that the meltflow temperature of a block copolymer is the temperature at the intersection of G' and G" in the flow region of the viscoelastic curve.

FIG. 1 shows a plot of G' versus temperature for a variety of block copolymers. The meltflow temperature progressively increases in this case for copolymers identified herein as Examples 1, 2, 3, and 4. The flow region could not be accessed for Example 5, even when heated to 240° C., and so it would be difficult to hot melt process this material without causing thermal degradation or without the use of other processing aids.

Different features of the molecular structures of the A and B polymers have been found to affect properties of bulk block copolymers such as tackiness (or non-tackiness), meltflow temperature, modulus, Tg, and cohesive strength. These features include the molecular weight of an A block polymer or a B block polymer and the ratio of the molecular weight of the A block polymer to the molecular weight of the B block polymer ($MW_A:MW_B$). In general, higher molecular weight A blocks increase cohesive strength of a bulk block copolymer, but will also increase meltflow temperature (for a given $MW_B$), which may not be desired. The ratio of $MW_A$ to $MW_B$ can have a significant effect on which phase is the continuous phase, the A block or the B block. This in turn can alter the properties of the block composition. Preferred block compositions have a continuous B block, and it can therefore be preferred to keep the ratio of $MW_A$ to $MW_B$ in a range to maintain the continuous B block.

Often, it is desirable to control (e.g., increase or decrease) the meltflow temperature of a block copolymer, while preferably retaining other desirable properties of the block copolymer. For instance, meltflow temperature of a block copolymer may be desirably reduced if degradation of a polymer is an issue (due to excessive processing temperature) or where a composition is coated onto a temperature sensitive substrate. At other times, meltflow temperature may desirably be increased, for example during co-extrusion of a block copolymer with another material having a higher meltflow temperature, to better match processing characteristics like viscosity.

Past methods of adjusting meltflow temperature have involved adjusting molecular weight of the A and/or B blocks. As described above, increasing or decreasing molecular weight of the blocks can affect (increase or decrease, respectively) the meltflow temperature of the bulk block copolymer. Unfortunately, the increase or decrease in molecular weight of the blocks will have a direct corresponding effect on other properties of the bulk block copolymer such as cohesive strength or elastomeric characteristics, which can be undesirable. Also unfortunately, the change in block molecular weight can cause an unintended and undesirable change in the ratio of $MW_A:MW_B$, which can further negatively affect one or more properties of the bulk block copolymer.

According to the invention, meltflow temperature of a block copolymer can be selectively controlled and adjusted by choosing the A block to be a copolymer, and by selecting the composition of the A block copolymer, i.e., the monomeric units that make up the A block copolymer, to achieve control of the meltflow temperature while preferably maintaining, at least to a desired extent, preferably a substantial extent, other desired properties of the block copolymer.

The invention specifically allows selection and adjustment of meltflow temperature of a block copolymer by adjusting the level of compatibility (or miscibility) between polymeric A and B blocks of a block copolymer, by selecting the composition of copolymeric A blocks. The composition of the A blocks is selected to include a first monomeric unit that provides strength and a desired glass transition temperature, and a second monomeric unit that desirably alters the meltflow temperature of the block copolymer without having to also significantly affect $MW_A$.

The invention can achieve advantageous rheological properties such as the ability to adjust, i.e., selectively increase or reduce, a meltflow temperature, while preferably still providing other desirable properties of a block copolymer such as high cohesive strength. By selecting the composition of an A block copolymer instead of or in addition to molecular weight of the A block, to adjust meltflow temperature, the level of compatibility between A blocks and B blocks can be selectively adjusted and controlled (increased or decreased) without requiring a change in $MW_A$ or the ratio of $MW_A$ to $MW_B$. Preferably, this can allow adjustment and control of meltflow temperature without causing the same degree of negative effects otherwise created by changing, e.g., increasing, $MW_A$. Optionally, in preferred embodiments, the use of copolymeric end block to alter meltflow temperature can allow the use of relatively higher molecular weight end block compared to the use of homopolymeric end block, because meltflow temperature can be maintained based on the composition of the copolymeric A block, even at higher molecular weights. A higher molecular weight A block may allow for improved cohesive strength, while still retaining a desired (e.g., low) meltflow temperature. Additionally, the molecular weight ratio of the A block copolymer to the B block polymer does not have to be affected and the B block can be maintained as the continuous phase.

The invention specifically contemplates block copolymers having at least one relatively high glass transition temperature copolymeric end block ("A block") and at least one relatively lower glass transition temperature polymeric B block, e.g., at the interior of the block copolymer. The end blocks can be collectively referred to as "A" blocks, but all A blocks of a block copolymer molecule or composition do not necessarily have chemically identical or similar composition, and while compositions of the invention include block copolymer with copolymeric A blocks, not all A blocks within a block copolymer or block copolymer composition are required to be copolymeric. Some may be homopolymers. B blocks may have the same or different composition and molecular weight, and may be homopolymeric or copolymeric.

Preferably, the block copolymer composition can comprise at least one of an (A-B) diblock copolymer, (A-B-A) triblock copolymer, an —(A-B)$_n$— multiblock copolymer, an (A-B)$_n$— star block copolymer, and may be a combination of two or more of these. Particularly preferred are linear (A-B-A) triblock and (A-B)$_n$— star block structures. In certain embodiments of the invention, the block copolymer can be a (meth)acrylate block copolymer, meaning that at least one of the A and B blocks is derived from one or more (meth)acrylate monomer.

A blocks of a particular copolymer molecule or of a bulk copolymer composition can be copolymers independently derived from a monoethylenically unsaturated monomer that as a homopolymer would have a glass transition temperature (Tg) of greater than about 20° C., preferably about 20° C. to about 200° C., and more preferably about 50° C. to about 150° C. The copolymer can be prepared from a first monoethylenically unsaturated monomer and a second monoethylenically unsaturated monomer, to comprise respective first and second monomeric units. A first monomeric unit can be selected to provide the described Tg of the A block. Certain preferred first monomeric units can be derived from linear and branched (meth)acrylate monomers such as methyl methacrylate, from ethylenically unsaturated cycloaliphatic monomers (e.g., cyclohexyl methacrylate, isobornyl methacrylate, or others) or styrenes, or from ethylenically unsaturated aromatic monomers (e.g., aromatic (meth) acrylates). A second monomeric unit can be selected to adjust melt processing properties of the block copolymer, preferably without substantially negatively affecting other desired properties of the bulk block copolymer. Certain preferred second monomeric units can be derived from polymerizable, substituted or unsubstituted, ethylenically unsaturated aromatic or cycloalkyl monomers, e.g., vinyl-functional or (meth)acrylate functional cycloalkyl or aromatic monomers such as styrene, cyclohexylmethacrylate, isobornylmethacrylate, and the like. Any useful relative amounts of the first and second monomers can be used, and additional monomers (e.g., a third or fourth monomer) can also be included in a copolymeric A block if desired, although, it can be preferred for simplicity that only a small number of monomers make up the A block copolymer, e.g., two or three.

According to certain methods of the invention, the copolymeric composition (optionally in combination with molecular weight) of an A block copolymer can be selected to control a meltflow temperature of the block copolymer, preferably while at least maintaining or perhaps even improving other desired block copolymer, structural features and their dependent properties, such as $MW_A:MW_B$ of the block copolymer molecule, or modulus or cohesive strength of a bulk block copolymer. A first monomeric unit can be identified which as a homopolymeric A block having molecular weight $MW_A$, in a particular block copolymer in combination with specified B blocks, would produce a block copolymer with certain properties of, e.g., meltflow temperature, modulus, or cohesive strength. According to the invention, the homopolymeric A block can be replaced with a copolymeric A block of the same molecular weight, that contains that same first monomeric unit in combination with a second monomeric unit. The copolymeric A block can contain second monomeric units to desirably affect compatibility between the A and B blocks, thereby increasing or decreasing the meltflow temperature of the bulk block copolymer, while preferably not substantially negatively affecting at least one other property of the block copolymer such as $MW_A:MW_B$ (and related properties), cohesive strength, or another important property of the block copolymer. According to this embodiment of the invention, the type and amount of second monomer can be selected to desirably increase or decrease meltflow temperature of the block copolymer compared to a block copolymer that is otherwise similar (e.g., having other of the same molecular properties such as $MW_A:MW_B$ and molecular weight of the A and B blocks) but does not contain the second monomeric units (i.e., the A block is a homopolymer of the first monomer). Also, use of copolymeric blocks in a block copolymer, according to the invention, can allow improvement of a block copolymer having good meltflow properties but poor adhesive properties. For example, including a copolymeric A block having a higher $MW_A$, in such a copolymer, can improve adhesive properties while retaining meltflow properties.

Preferred A block copolymers can each have a weight average molecular weight of less than about 100,000 grams per mole e.g., from about 3,000 to about 50,000 grams per mole.

Typically, the B block can be a polymer derived from a monoethylenically unsaturated monomer, that as a homopolymer has a glass transition temperature (Tg) of less than about 20° C., preferably about −70° C. to about 20° C., and more preferably −60° C. to about 0° C. Preferably, the monoethylenically unsaturated monomer can be a (meth) acrylate monomer. B blocks can have a weight average molecular weight of about 30,000 to about 500,000 grams per mole, more preferably about 50,000 to about 200,000 grams per mole.

The block copolymer can be useful alone or in combination with other polymeric or non-polymeric materials, preferably in any of a variety of melt-processable, e.g., "thermoplastic," polymeric compositions, such as adhesives, sealants, elastomers, reinforced rubber, and other polymeric compositions. In one embodiment, the block copolymer can be used as or included in a melt-processable adhesive composition, e.g., a pressure sensitive adhesive. Examples of such adhesive compositions may contain the block copolymer as the only or essentially the only elastomeric component, e.g., may consist of or consist essentially of the block copolymer and optional adhesive composition additives such as a tackifier: e.g., 100 parts by weight of at least one block copolymer comprising at least two copolymeric A blocks and at least one homopolymeric or copolymeric B block, and 10 to 200 parts by weight of at least one tackifier based on total weight of the block copolymer.

Exemplary adhesive compositions of the invention can be pressure sensitive adhesive (PSA) compositions. However, the invention also contemplates other adhesive compositions such as heat-activatable adhesive compositions, as well as non-adhesive compositions.

Preferred adhesive compositions can be formulated to have a cohesive strength of at least about 2,000 minutes when measured according to ASTM D 3654, more preferably a cohesive strength of at least about 5,000 or 6,000 minutes when measured according to ASTM D 3654, and even more preferably, at least about 10,000 minutes when measured according to ASTM D 3654.

Broad formulation latitude is possible in block copolymer compositions of the invention while maintaining melt-processability and processing efficiency. For example, adhesives such as PSAs are obtainable even when elastomeric components in the composition consist of or consist essentially of the block copolymer. Thus, blending of more than one elastomeric component is not required to produce adhesive compositions according to the invention.

An aspect of the invention relates to a method of controlling meltflow temperature of a poly(meth)acrylate block copolymer, the meltflow temperature of the block copolymer being in the range from 50° C. to 250° C. The method comprises providing block copolymer comprising at least one low glass transition temperature polymeric block and at least one high glass transition temperature copolymeric end block comprising first monomeric units and second monomeric units, and selecting the amount and type of the second monomeric units to selectively increase or decrease meltflow temperature of the block copolymer compared to a block copolymer that is otherwise similar but does not contain the second monomeric units.

Another aspect of the invention relates to a melt-processable poly(meth)acrylate composition comprising block copolymer. The block copolymer comprises at least one high glass transition temperature copolymeric end blocks, and at least one low glass transition temperature polymeric block. The high glass transition copolymeric block comprises first monomeric units and second monomeric units, the second monomeric units increasing or decreasing meltflow temperature of the block copolymer compared to a similar block copolymer that does not contain the second monomeric units, and the meltflow temperature of the block copolymer is in the range from 50° C. to 250° C.

Still another aspect of the invention relates to a melt processable, thermoplastic poly(meth)acrylate block copolymer. The copolymer comprises at least one soft polymeric block, and at least two hard copolymeric end blocks having a glass transition temperature of from 20° C. to 200° C. and comprising first monomeric units selected from the group consisting of linear and branched alkyl (meth)acrylates, cycloaliphatic monomeric units, and aromatic monomeric units, and second monomeric units selected from the group consisting of cycloaliphatic monomeric units, aromatic monomeric units, and low glass transition temperature linear or branched alkyl acrylate or alkyl methacrylate monomeric units. The block copolymer has a meltflow temperature from 50° C. to 250° C.

Another aspect of the invention relates to a melt processable, thermoplastic block copolymer. The block copolymer comprises at least one soft polymeric block, and at least two hard copolymeric end blocks having a glass transition temperature of from 20° C. to 200° C. and comprising first monomeric units selected from the group consisting of ethylenically unsaturated polymerizable cycloaliphatic monomeric units, and second monomeric units selected from the group consisting of ethylenically unsaturated polymerizable aromatic monomeric units. The block copolymer has a meltflow temperature in the range from 50° C. to 250° C.

DETAILED DESCRIPTION

Figure 1:
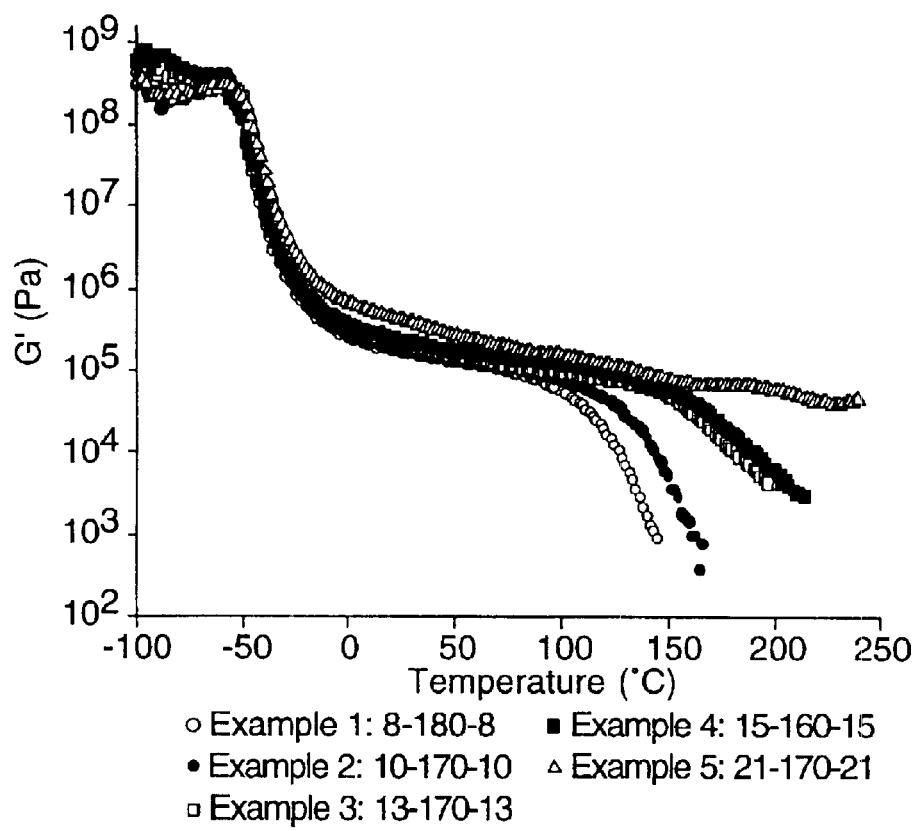
FIG. 1 illustrates a plot of G' versus temperature.
Figure 2:
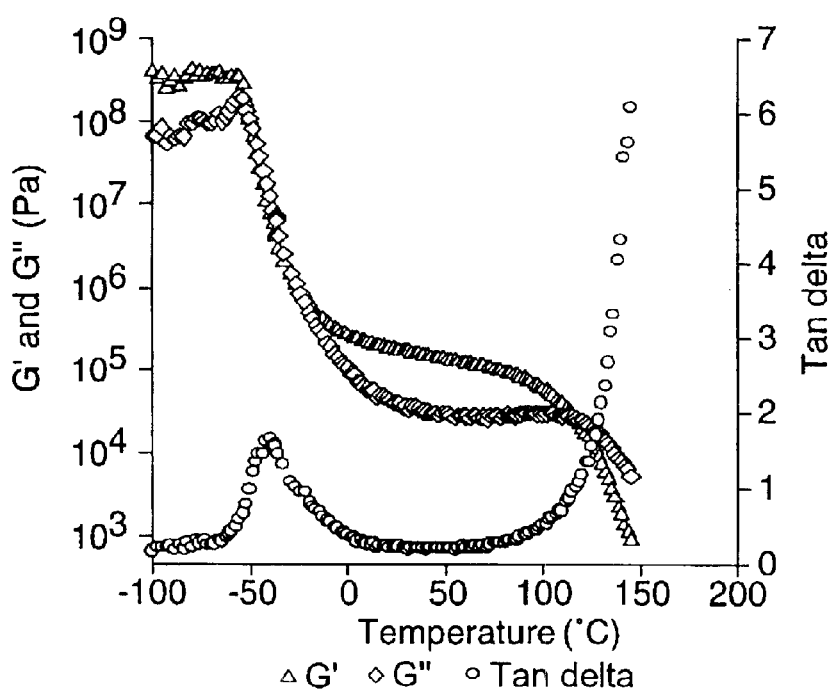
FIG. 2 illustrates a plot of G', G" and tan delta versus temperature.

The invention relates to block copolymers and melt-processable compositions that contain block copolymers. The composition may be an adhesive, such as a pressure sensitive adhesive, or a non-adhesive, such as a sealant, an elastomer such as a reinforced rubber, or any other type of adhesive or non-adhesive, elastomeric or polymeric composition that is desirably melt processable and useful in an application suitable for melt-processable polymeric materials.

"Block copolymers" as described herein are polymeric elastomeric materials in which chemically different blocks or sequences bind each other in macromolecular chains. Block copolymers of the invention can be divided into two main classes: linear block copolymers and branched block copolymers. Examples of linear block copolymers include diblock ((A-B) structure), triblock ((A-B-A) structure), and multiblock (—(A-B)$_n$— structure) copolymers while an example of branched block copolymer is a star block copolymer ((A-B)$_n$— structure). Star block copolymers are also referred to as radial or palmtree copolymers, as they have a central point from which branches extend. Block copolymers herein are to be distinguished from comb-type polymer structures and other branched copolymers. These other branched structures do not have a central point from which branches extend.

Compositions of the invention can advantageously be "thermoplastic," meaning that compositions are able to remain melt-processable after application and cooling, yet retain preferred characteristics of a crosslinked polymer (e.g., high cohesive strength and/or creep resistance). Thus, such embodiments of compositions of the invention may be repeatedly melt-processed, while still providing desirable properties such as useful cohesive strength, tack, Tg, modulus, and other useful and desired properties of adhesives, sealants, and elastomers, after each application.

Block Copolymers

Block copolymers of the invention comprise at least a copolymeric A (or "end") blocks and at least one B block that is internal to the polymer. Preferred block copolymers of the invention may comprise at least two copolymeric A (or "end") blocks and at least one B block that is internal to the polymer. The A blocks in block copolymer structures represent relatively high glass transition temperature thermoplastic segments, while the B blocks represent relatively low glass transition temperature elastomeric segments. The A and B blocks can be derived from monoethylenically unsaturated monomers to preferably result in saturated polymeric backbones that do not require subsequent hydrogenation after polymerization to become saturated. Preferably, at least one of the A and B blocks can be derived from one or more (meth)acrylate monomer. Most preferred, at least the B block is derived from one or more (meth)acrylate monomer. (Meth)acrylate-derived blocks contribute to preferred properties (e.g., durability, permanence of properties over time, and versatility of adhesion) in the block copolymer composition.

The block copolymer, at use temperatures, preferably has an ordered multiphase morphology. The A blocks are more rigid (i.e., they have a higher shear modulus and glass transition temperature) than the B blocks. Typically, the A blocks provide discrete reinforcing microdomains within an overwhelming continuous phase formed from less rigid B blocks. Generally, the copolymeric A blocks can be selected such that their solubility parameters are sufficiently different from those of the B blocks to cause the appropriate phase separation between the A and B blocks to cohesively reinforce the elastomer at use temperatures. The term "phase separation" as used herein refers to the presence of distinct reinforcing A block domains (i.e., microdomains) in a matrix comprised of the softer B block phase.

Block copolymers designed to be useful with pressure sensitive adhesive compositions can be formulated to have a glass transition temperature (Tg) of the B block of less than about 0° C. For heat-activatable adhesives, the block copolymer can be tailored to have a Tg of the B block of about 25° C. to about 30° C. below the desired heat-activation temperature. Heat-activatable adhesives are well understood generally to not be pressure sensitive at a reduced (e.g., room) temperature, but to exhibit pressure sensitive adhesive properties at higher temperatures, so as to form a bond at higher temperatures which can remain upon cooling back to the reduced temperature.

The relative amounts of each block of a block copolymer, e.g., as measured by molecular weight, can be any relative amounts that provide a useful block copolymer composition. As stated, the ratio of $MW_A:MW_B$ can relate to properties of the block copolymer composition such as cohesive strength and modulus. Useful values of the ratio of $MW_A:MW_B$ will depend on factors such as the particular type of block copolymer (e.g., star-block, tri-block, etc.), the particular chemistries of the different blocks, and whether other ingredients are included in a block copolymer composition. Generally, useful relative amounts of A block to B block can be amounts that provide the desired morphological structure of the block copolymer composition, including an ordered multiphase composition having discontinuous A block phase in a continuous B block phase at use temperatures and a melt processable morphology at processing temperatures, especially in a range from 50° C. to 250° C. In addition to these morphologies, the relative amounts of A and B block polymers should provide useful properties such as cohesive strength, modulus, etc. The relative amounts of A and B blocks in any particular block copolymer will depend on many factors such as the compositions of each block and the desired properties of the block copolymer composition. Exemplary ranges for adhesives and elastomers may be in the range from about 5 to 45 parts by weight A block per 55 to 95 parts by weight B block, but it is understood that relative amounts outside of these ranges may also be useful.

A Blocks

Generally, A blocks are copolymeric, preferably thermoplastic (i.e., they soften when exposed to heat and return to their original condition when cooled below their glass transition temperature) end blocks. The A blocks of preferred block copolymers can be derived from two or more polymerizable unsaturated monomers, at least one of which monomers (e.g., the monomer present in the greatest amount), if separately formed to a homopolymer, would have a glass transition temperature (Tg) greater than about 20° C., preferably from about 20° C. to about 200° C., more preferably from about 50° to about 180° C., and even more preferably from 100° C. to about 180° C.

Copolymers of the A block can be prepared from a first monoethylenically unsaturated monomer and a second monoethylenically unsaturated monomer, to comprise respective first and second monomeric units. The monomeric units may be derived from suitable polymerizable monomers including (meth)acrylate monomers, acrylamides, and vinyl unsaturated monomers.

In certain embodiments of the invention, first monomeric units can be selected as derived from linear and branched (meth)acrylate monomers, such as methyl methacrylate. Useful (meth)acrylate monomers have the following general Formula (I):

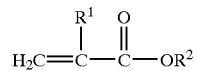

wherein $R^1$ is H or $CH_3$, the latter corresponding to where the (meth)acrylate monomer is a methacrylate monomer.

$R^2$ is a hydrocarbon group broadly selected from linear, branched, aromatic, or cyclic hydrocarbon groups. Preferably, for first monomeric units $R^2$ is a linear or branched hydrocarbon group. The number of carbon atoms in the hydrocarbon group is preferably about 1 to about 20, and more preferably about 1 to about 18. When $R^2$ is a hydrocarbon group, it can also include heteroatoms (e.g., oxygen or sulfur).

Particularly preferred linear and branched (meth)acrylate monomers for a first monomeric unit include alkyl (meth)acrylate monomers which, as homopolymers, exhibit relatively high glass transition temperatures, including ethyl methacrylate and methyl methacrylate, especially methyl methacrylate.

Vinyl terminated linear or branched monomers can also be useful as first monomeric units, e.g., vinyl esters such as vinyl acetate. Also, a first monomeric unit may be derived from substituted or non-substituted polymerizable aromatic or cycloalkyl monomers, as are described in more specific detail below with respect to second monomeric units. If this is the case, the first and second monomeric units are still different.

The second monomeric unit can be selected to adjust the melt processing properties of the block copolymer, specifically including the meltflow temperature. Certain preferred second monomeric units can be derived from polymerizable, substituted or unsubstituted, ethylenically unsaturated aromatic or cycloalkyl monomers, e.g., vinyl-functional or (meth)acrylate functional cycloalkyl or aromatic monomers, as well as relatively lower glass transition temperature linear or branched alkyl acrylate and methacrylate monomers.

Suitable aromatic or cycloalkyl (meth)acrylate monomers for a second monomeric unit include benzyl acrylate, benzyl methacrylate, cyclohexyl acrylate, cyclohexyl methacrylate, isobornyl acrylate, isobornyl methacrylate, phenylacrylate, phenyl methacrylate, phenethyl acrylate, phenethyl methacrylate, 2-naphthyl acrylate, and 2-naphthyl methacrylate. Other variations or substituted versions of these compounds would also be useful, but may not be as commercially available.

Suitable aromatic or cycloalkyl vinyl-terminated monomers for a second monomeric unit include, for example, styrenes such as styrene, alpha-methylstyrene, t-butylstyrene. A particularly preferred vinyl-terminated monomer is styrene. Other variations or substituted versions of these compounds would also be useful, but may not be as commercially available.

Linear or branched alkyl acrylate and methacrylate monomers suitable for second monomers can include relatively low glass transition temperature (meth)acrylate monomers, e.g., monomers that as homopolymers have a Tg in the range of from 50° C. to −70° C., including ethyl methacrylate, n-butyl acrylate, n-butyl methacrylate, decyl acrylate, 2-ethoxy ethyl acrylate, 2-ethoxy ethyl methacrylate, isoamyl acrylate, n-hexyl acrylate, n-hexyl methacrylate, isobutyl acrylate, isodecyl acrylate, isodecyl methacrylate, isononyl acrylate, 2-ethylhexyl acrylate, 2-ethylhexyl methacrylate, isooctyl acrylate, isooctyl methacrylate, isotridecyl acrylate, lauryl acrylate, lauryl methacrylate, 2-methoxy ethyl acrylate, 2-methyl butyl acrylate, 4-methyl-2-pentyl acrylate, n-octyl acrylate, and n-octyl methacrylate. Also suitable are the n- and t-alkyl acrylamides and methacrylamides, such as N-octyl acrylamide, t-butyl acrylamide, and N-isopropylacrylamide.

Particularly preferred monomers for second monomeric units include styrene, cyclohexylmethyl methacrylate, and isobornyl methacrylate.

Depending on various factors, any useful relative amounts of first and second monomers can be used to prepare a copolymeric A block. The "first," relatively high glass transition temperature monomeric unit is typically present in an amount to give a desirably high glass transition temperature, and is typically present as at least 50 molar percent of the monomeric units of the A block. Factors that will affect the relative amounts of the first and second monomers in any particular block copolymer may include: the chemical identities of the first and second monomers, the molecular weight of the A block, and the chemical composition and molecular weight of the B block. For example, if the second monomer is a relatively low glass transition temperature yielding linear or branched (meth)acrylate, only a relatively small amount can be included so that a desirably high Tg of the A block is maintained. If the glass transition temperatures of the first and second monomers are nearly the same, then either may be used in a very broad range of relative amounts.

Additional monomers (e.g., a third or fourth monomer) can be included in a copolymeric A block, although it can be preferred for simplicity that only a small number of different monomers make up the A copolymer, e.g., two or three. Examples of other monomers could be reactive monomers that would allow crosslinking of the block copolymer. Specific examples may include acrylic acid, 2-hydroxyethyl (meth)acrylate (for chemical crosslinking); and 4-acryloxybenzophenone (for photo crosslinking).

While it is desired that the copolymeric blocks be relatively pure, meaning that there are few if any monomeric units in the A block that were intended to be part of the B block, such accidental impurity can occur, but by itself is not considered to constitute a copolymeric A block as described herein.

The A blocks can be of any molecular weight that provides useful properties such as meltflow temperature, modulus, cohesive strength, and desired (high or low) tackiness, for a given block copolymer composition. Preferred molecular weights can provide a desired combination of these properties. Exemplary molecular weights can be weight average molecular weights below about 100,000 grams per mole, with a weight average molecular weight of about 3,000 to about 50,000 grams per mole being preferred. These relatively low molecular weights facilitate melt-processing of adhesives comprising the block copolymers. Advantageously, the use of copolymeric A blocks as described herein, instead of homopolymers, can in certain embodiments of the invention allow for the use of higher molecular weight copolymeric end blocks (as opposed to homopolymeric end blocks) while still maintaining melt-processability in a particular temperature range.

Although this description specifies that block copolymer compositions of the invention include copolymeric A blocks, a block copolymer molecule or composition can also include some A blocks that are homopolymers, if desired.

B Blocks

Generally, the B blocks are elastomeric polymeric blocks, e.g., homopolymers or copolymers, derived from monoethylenically unsaturated monomers. In particular embodiments, the B block can be derived from monoethylenically unsaturated monomer that as a homopolymer has a glass transition temperature (Tg) of less than about 20° C., particularly when the composition can inherently be a pressure sensitive adhesive block copolymer, without the need for added plasticizer or tackifier. In other particular embodiments, B block polymers can be derived from monoethylenically unsaturated monomers that as homopolymers have a Tg of about −70° C. to about 20° C., more preferably from about −60° C. to about 0° C., or from −60° C. to about −10° C.

When the block copolymer is designed for use as or in a heat-activatable adhesive, monomer selection for the B block can be modified accordingly. For example, monomers used to prepare a B block for use as or in a heat-activatable adhesive can be selected such that the resulting polymer has a bulk modulus greater than the Dahlquist criterion. Alternatively, Tg of the B block can be controlled to provide a resultant block copolymer having a Tg of about 25° C. to about 30° C. below the desired heat-activation temperature. Another way of obtaining heat-activatable adhesives is by adding a large proportion of tackifiers to the adhesive composition (see below).

Preferred B blocks can be homopolymers and copolymers derived from one or more monoethylenically unsaturated monomers such as (meth)acrylate esters of non-tertiary alkyl alcohols, the alkyl groups of which comprise from about 1 to about 20, preferably about 1 to about 18 carbon atoms, including polar monomers such as methacrylic acid, itaconic acid, and acrylic acid, N-alkylated or N,N-dialkylated acrylamides and methacrylamides; hydroxyalkyl methacrylates and acrylates; and vinyl-terminated monomers (e.g., vinyl esters). Preferred B blocks can be derived from at least one (meth)acrylate monomer.

Useful (meth)acrylate monomers have the following general Formula (I):

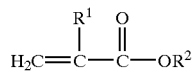

wherein $R^1$ is H or $CH_3$, the latter corresponding to where the (meth)acrylate monomer is a methacrylate monomer. Preferably, $R^1$ is H, as acrylates are generally less rigid than their methacrylate counterparts.

$R^2$ is a hydrocarbon group broadly selected from linear, branched, aromatic, or cyclic hydrocarbon groups. Preferably, $R^2$ is a linear or branched hydrocarbon group. The number of carbon atoms in the hydrocarbon group is preferably about 1 to about 20, and more preferably about 1 to about 18. When $R^2$ is a hydrocarbon group, it can also include heteroatoms (e.g., oxygen or sulfur).

Suitable (meth)acrylate monomers for a B block can include, for example, n-butyl acrylate, decyl acrylate, 2-ethoxy ethyl acrylate, 2-ethoxy ethyl methacrylate, isoamyl acrylate, n-hexyl acrylate, n-hexyl methacrylate, isobutyl acrylate, isodecyl acrylate, isodecyl methacrylate, isononyl acrylate, 2-ethylhexyl acrylate, 2-ethylhexyl methacrylate, isooctyl acrylate, isooctyl methacrylate, isotridecyl acrylate, lauryl acrylate, lauryl methacrylate, 2-methoxy ethyl acrylate, 2-methyl butyl acrylate, 4-methyl-2-pentyl acrylate, n-octyl acrylate, and n-octyl methacrylate, and polar monomers such as acrylic acid, methyl methacrylate, or other polar monomers as mentioned above. Typically, such polar monomers can be useful at levels below 40 parts by weight per 100 parts by weight of total monomer used in a B block, e.g., from 0 to 20 parts by weight polar monomer per 100 parts by weight total B block.

Monomeric units analogous to those desired from (meth)acrylate monomers that are synthetically undesirable or commercially unavailable can be provided through trans-alcoholysis (i.e., replacement of an alcohol group on the B block by a different alcohol group) or hydrolysis of a polymerized B block. When the polymerized B block is hydrolyzed, it can be followed by esterification. This process may leave some residual acid in the block copolymer.

The molecular weight of the B block can be such that a continuous phase is formed in the block copolymer. Preferably, the B blocks have a weight average molecular weight of about 30,000 to about 500,000 grams per mole and, more preferably, a weight average molecular weight of about 70,000 to about 200,000 grams per mole.

Polymerization

Any technique that produces well-controlled block copolymer structures can be suitable for preparing block copolymers of the invention. (See, e.g., WO 00/39233, incorporated herein by reference.) These techniques can include living free radical polymerization techniques, living anionic polymerization, and group transfer polymerization. Specific examples of living free radical polymerization include: atom transfer polymerization, reversible addition-fragmentation chain transfer polymerization, and nitroxide-mediated polymerization.

Living anionic polymerization typically leads to more stereoregular block structures than those blocks polymerized using free radical polymerization. Stereoregularity (as evidenced by highly syndiotactic and/or isotactic structures) contributes to block copolymers having well-controlled block structures and influences the glass transition temperature of the block. For example, syndiotactic polymethyl methacrylate (PMMA) synthesized using living polymerization has a glass transition temperature that is about 20–25° C. higher than a comparable PMMA synthesized using conventional free radical polymerization. Stereoregularity is detectable, for example, using nuclear magnetic resonance spectroscopy, differential scanning calorimetry, or similar analytical techniques. Structures with greater than about 75% stereoregularity are obtainable when using living polymerization.

Living anionic polymerization is sometimes preferred. However, when polymerizing at higher temperatures (e.g., greater than about −40° C.), living free radical polymerization may be preferred, as living free radical polymerization is typically less sensitive to high temperature than is living anionic polymerization.

Preferably, the molecular weight of the block copolymer is controlled. That is, theoretical molecular weight ranges of the A and B blocks are obtainable after polymerization. Preferably the resulting molecular weight is about 0.7 to about 1.5 times the predicted molecular weight, more preferably about 0.8 to about 1.2 times the predicted molecular weight, and most preferably about 0.9 to about 1.1 times the predicted molecular weight. As such, desired block copolymer structures can be designed (i.e., theoretically) and then easily replicated by the selected polymerization method.

In certain embodiments of the block copolymer, where desired or useful, polydispersity (as measured, for example, by gel permeation chromatography) of each block and the overall block copolymer can be about 2.0 or less, e.g., about 1.7 or less, and even about 1.5 or less. If desired, polydispersity of each block and the overall block copolymer can be as close to 1.0 as possible.

Also in certain embodiments of the invention, if desired, boundaries between microdomains comprising the A blocks and the continuous phase comprising the B blocks can be well-defined (i.e., the boundaries are essentially free of tapered structures—those structures derived from monomers used for both the A and B blocks). Tapered structures can affect onset of flow (i.e., typically decrease it), and also can affect cohesive strength.

When using living anionic polymerization to form a block copolymer, typically the first step of the process involves contacting monomers of the A block with an initiator in the presence of an inert diluent to form a living polymer. The inert diluent used in the polymerization process facilitates heat transfer and adequate mixing of the initiator and monomer. Any suitable inert diluent may be used. Typically the inert diluent can be a saturated hydrocarbon, aromatic hydrocarbon, or ether. Examples of such diluents include: saturated aliphatic and cycloaliphatic hydrocarbons, such as hexane, heptane, octane, cyclohexane, and the like; and aromatic hydrocarbons, such as toluene. In addition, aliphatic and cyclic ether solvents may be used, such as dimethyl ether, diethyl ether, and tetrahydrofuran.

When using living anionic polymerization, the living polymer can be represented by a simplified structure, A-M, where M represents a Group I metal such as Li, Na and K and A represents the A block. For example, when a charge of different monomer (B) is then added, followed by another charge of monomer for the A block, an (A-B-A) triblock copolymer results. The molecular weight of the polymer blocks formed is determined by the amounts of initiator and monomer used. Alternatively, living A-B-M (i.e., a living diblock) can be coupled using difunctional or multifunctional coupling agents to form (A-B-A) triblock or (A-B)$_n$— star block copolymers, respectively.

Any suitable initiator or combination thereof can be used. Typical initiators include alkali metal hydrocarbons. For example, monofunctional initiators are useful initiators in the first step of the process described above, such as organomonolithium. These compounds are represented by the structure R-Li where "R" is an aliphatic, cycloaliphatic or aromatic radical and "Li" is lithium. Examples include ethyl lithium, n-propyl lithium, iso-propyl lithium, n-butyl lithium, sec-butyl lithium, tert-octyl lithium, n-decyl-lithium, phenyl lithium, 2-naphthyl lithium, 4-butylphenyl lithium, 4-phenylbutyl lithium, cyclohexyl lithium, and the like.

Difunctional initiators may also be used. Difunctional initiators include, for example, 1,1,4,4-tetraphenyl- 1,4-dilithiobutane; 1,1,4,4-tetraphenyl- 1,4-dilithioisobutane; naphthalenelithium; naphthalenesodium; naphthalenepotassium; homologues thereof; dilithium initiators (e.g., those prepared by addition reaction of alkyl lithium with a divinyl compound, for example, 1,3-bis(1-phenylethenyl)benzene; m-diisopropenylbenzene); and the like.

Co-initiators may also be used. Co-initiators include, for example, lithium halides (e.g., lithium chloride); alkali metal alkoxides; oligomeric (or polymeric) ethers or amides, alkali metal derivatives thereof; and alkyl aluminum compounds.

When living free radical polymerization is used, any suitable initiator or combination thereof can be used. For a description of living free radical polymerization and suitable initiators, see PCT Publication No. WO 97/18,247 (Carnegie Mellon) and PCT Publication No. WO 98/01,478 (E.I. duPont de Nemours and Co.).

The amount of initiator used during living polymerization usually affects the molecular weight of the living polymer. If a small portion of initiator is used with respect to the amount of monomer, the molecular weight of the living polymer will generally be larger than if a large portion of initiator is used.

For living anionic polymerization, it is generally advisable to add the initiator dropwise to the monomer until the persistence of the characteristic color of the organic anion in the initiator is observed. Then, the calculated amount of the initiator is added for the molecular weight desired. The preliminary dropwise addition serves to destroy contaminants and, thus, permits better control of the polymerization.

The polymerization temperature will depend on the monomers being polymerized and the type of polymerization method being used. Generally, the reaction can be carried out at a temperature ranging from about −100° C. to about 100° C. Usually the polymerization temperature is about −80° C. to about 20° C. when using living anionic polymerization and about 20° C. to about 100° C. when using living free radical polymerization.

In general, the polymerization should be carried out under controlled conditions to exclude substances that destroy the initiator, radical, or living anion. Typically, the polymerization can be carried out in an inert atmosphere, such as nitrogen, helium, or argon. When living anionic polymerization is used, anhydrous conditions may be necessary.

Compositions Containing the Block Copolymer

The block copolymer can be used by itself or in combination with other ingredients to provide any of a variety of useful polymeric compositions, including sealants, adhesives, elastomers, or other melt-processable polymeric compositions.

Adhesives of the invention can comprise a major proportion of at least one block copolymer (more than one block copolymer of the present invention may be blended together) of the invention with respect to the total elastomeric components. "Elastomeric components" are components having the ability to be stretched to at least twice their original length and to retract very rapidly to approximately their original length when released. Block copolymers of the invention do not need to be used in combination with one or more other adhesive ingredients, but an adhesive composition of the invention can consist of or consist essentially of block copolymer of the invention as the only elastomeric component. In certain preferred embodiments of adhesive compositions, other elastomeric components are not present at all or are present only in minor amounts such as less than about 5 parts by weight of the total adhesive composition.

Particular embodiments of the invention include compositions that work as pressure sensitive adhesives (PSAs). PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend.

"Heat-activatable adhesive systems" are another type of melt-processable composition contemplated by the invention. Heat-activatable adhesives are substantially nontacky at room temperature, but become tacky upon heating. Heat-activatable systems, unlike PSA systems, rely on a combination of pressure and heat to bond to a surface.

Components of compositions of the invention can advantageously be selected to provide melt-processable adhesives without sacrificing cohesive strength of the applied adhesive. Preferred adhesives according to the invention can have cohesive strengths of at least about 2,000 minutes, more preferably at least about 6,000 minutes, and most preferably at least about 10,000 minutes when measured according to ASTM D 3654. These cohesive strengths are obtainable even in the absence of chemical crosslinking.

One potential advantage of block copolymers of the invention is that they have adequate cohesive strength for many applications, after application, without the need for subsequent curing steps. Although generally not necessary, additional curing steps may be used, however, if so desired. Such additional curing steps include exposing the adhesive to radiation, such as ultraviolet or electron beam radiation.

Additives

Other ingredients and additives may be combined with the block copolymer prior to use or application thereof, the type and amount depending on the desired properties of the block copolymer composition.

Any suitable additive may be blended into the block copolymer. For example, to improve melt-processability, A block-compatible resins may also be used in the compositions. Those of ordinary skill in the block copolymer art will recognize many suitable additives. However, solubility parameter differences between blocks in rubber-based (e.g., polystyrene-polydiene type) block copolymers are usually different than in copolymers of the present invention containing blocks derived from monoethylenically unsaturated monomers, such as (meth)acrylate monomers (i.e., the difference in solubility parameters between the A and B blocks is typically smaller than in rubber-based block copolymers). Thus, selective tackification or plasticization of each block requires different considerations than when rubber-based block copolymers are used. Thus, additive selection in the present case is quite different than when rubber-based block copolymers are used.

Preferably, any additive used, however, is compatible with the B block of the block copolymer of the invention. An additive is compatible in a phase (e.g., A block or B block) if it causes a shift in the glass transition temperature (Tg) of that phase (assuming that the tackifier and the tackifier-free phase do not have the same Tg).

Other polymers or non-polymers, or other types of the inventive block copolymer, may be blended with the block copolymer composition. However, in certain embodiments of the invention, this is not necessary. For example, minor amounts of block copolymers having an (A-B) diblock structure may be present in block copolymers having a different block structure, e.g., A-B-A. Alternatively, it may be desirable to add further block copolymer having an (A-B) diblock structure to a composition containing a different structure, e.g., A-B-A. The further addition of diblock copolymer may facilitate melt-processability of a composition comprising an A-B-A copolymer, as well as increase the level of tack (depending on the compositions of A and B). Typically, if a block copolymer having an (A-B) diblock structure is used with an A-B-A block copolymer, the amount of A-B diblock copolymer can be up to about 80 parts by weight based on 100 parts by weight of the A-B-A block copolymer. Preferably at least the A block of such diblock copolymer is the same chemical composition as the A block of the A-B-A block copolymer, most preferably both the A and B blocks are the same chemical composition as the A and B blocks of the A-B-A block copolymer.

Certain embodiments of the block copolymer of the invention may not be sufficiently tacky for a desired application, e.g., as a pressure sensitive adhesive. Thus, it may be useful, if desired, to add a tackifying resin (i.e., tackifier or combination of them) to increase a tack. It may be useful to use relatively large proportions of tackifying resins, if desired. In general, tackifying resins are less expensive than block copolymers. Furthermore, large proportions of B block compatible tackifying resins may also be desirable when formulating to provide heat-activatable adhesives. Tackifying resins can also facilitate melt-processability.

Typically, at least one tackifying resin can be selected to be compatible with the B block, but it may also be partially compatible with the A block. Preferably, a tackifying resin can be compatible with the B block and incompatible with the A block.

Solid or liquid tackifiers can be used. Solid tackifiers generally have a number average molecular weight (Mn) of 10,000 grams per mole or less and a softening point above about 70° C. Liquid tackifiers are viscous materials that have a softening point of about 0° C. to about 70° C.

Suitable tackifying resins include rosins and their derivatives (e.g., rosin esters); polyterpenes and aromatic-modified polyterpene resins; coumarone-indene resins; and hydrocarbon resins, for example, alpha pinene-based resins, beta pinene-based resins, limonene-based resins, aliphatic hydrocarbon-based resins, aromatic-modified hydrocarbon-based resins, aromatic hydrocarbon resins, and dicyclopentadiene-based resins. Non-hydrogenated tackifying resins are typically more colored and less durable (i.e., weatherable) than block copolymers of the present invention. Thus, when appropriate, hydrogenated (either partially or completely) tackifying resins may also be used. Examples of hydrogenated tackifying resins include, for example: hydrogenated rosin esters, hydrogenated rosin acids, hydrogenated aromatic hydrocarbon resins, hydrogenated aromatic-modified hydrocarbon-based resins, and hydrogenated aliphatic hydrocarbon-based resins. Particularly preferred hydrogenated tackifying resins include hydrogenated rosin esters, hydrogenated rosin acids, hydrogenated aromatic hydrocarbon resins, and hydrogenated aromatic-modified hydrocarbon-based resins.

Any useful amount of tackifying resin may be combined with a useful amount of block copolymer and optionally other ingredients. For example, tackifying resin can be present in an adhesive composition in an amount of about 10 to about 200 parts by weight tackifier based on 100 parts by weight block copolymer. Higher or lower amounts may be desired, however, especially higher amounts when formulating heat-activatable adhesives.

Plasticizers may also be used in combination with the block copolymer. Plasticizers are well known and may include, for example, hydrocarbon oils (e.g., those that are aromatic, paraffinic, or naphthenic), hydrocarbon resins, polyterpenes, rosin esters, phthalates, phosphate esters, dibasic acid esters, fatty acid esters, polyethers, and combinations thereof. Plasticizers are optional and may be present in compositions of the invention in any suitable amount, such as for example, amounts up to about 100 parts by weight, preferably up to about 50 parts by weight, based on 100 parts by weight of block copolymer. These plasticizers may or may not be used in combination with the tackifiers described above.

Photocrosslinkers can also be added for optional subsequent curing by UV-irradiation. Conventional crosslinking agents (physical, ionic, and chemical crosslinking agents) can also be used in embodiments of the present invention. Crosslinkers are optional and may be present in compositions of the invention in any suitable amount, such as amounts up to about 5 parts by weight based on 100 parts by weight of the total composition.

Other optional additives include, for example, stabilizers (e.g., antioxidants or UV-stabilizers), pigments, fillers, medicaments, and the like. The use of such additives is well known to those of ordinary skill.

Application of Melt-processable Adhesive Compositions

Preferred block copolymer compositions can be readily applied to a substrate by melt processing methods. For example, a melt-processable adhesive can be applied to a sheeting product (e.g., decorative, reflective, and graphical); borders of, for example, medical electrodes and drug delivery patches; labelstock; and tape backings. The substrate can be any suitable type of material depending on the desired application. Typical substrates can comprise a nonwoven, woven, foam, paper, polypropylene (e.g., biaxially oriented polypropylene (BOPP)), polyethylene, polyester (e.g., polyethylene terephthalate), or release liner (e.g., siliconized liner).

Thus, melt-processable adhesives according to the present invention can be used to form tape, for example. To form a tape, a melt-processable adhesive is coated onto at least a portion of a suitable backing. A release material (e.g., low adhesion backsize) can be applied to the opposite side of the backing, if desired. When double-sided tapes are formed, adhesives are coated onto at least a portion of both sides of the backing.

Melt-processable block copolymer compositions of the invention can be applied to substrates using methods well known to one of ordinary skill. For example, the block copolymer and other components can be blended and applied using for example, one of spraying, melt-extruding, blowing (e.g., into blown microfibers), printing (e.g. rotary screen-printing) and foaming techniques to form adhesive-coated substrates of the present invention.

An adhesive or other block copolymer composition can be formed into a film or coating by either continuous or batch processes. An example of a batch process is the placement of a portion of adhesive between a substrate to which the film or coating is to be adhered and a surface capable of releasing the adhesive film or coating to form a composite structure. The composite structure can then be compressed at a sufficient temperature and pressure to form an adhesive coating or layer of a desired thickness after cooling. Alternatively, the adhesive can be compressed between two release surfaces and cooled to form an adhesive transfer tape useful in laminating applications.

Continuous forming methods include drawing the melt-processable block copolymer composition from a film die and subsequently contacting the drawn adhesive to a moving plastic web or other suitable substrate. A related continuous method involves extruding the composition and a coextruded backing material from a film die and cooling the layered product, e.g., to form an adhesive tape. Other continuous forming methods involve directly contacting a block copolymer composition to a rapidly moving plastic web or other suitable preformed substrate. Using this method, the block copolymer composition can be applied to the moving preformed web using a die having flexible die lips, such as a rotary rod die. After forming by any of these continuous methods, the block copolymer films or layers can be solidified by quenching using both direct methods (e.g., chill rolls or water baths) and indirect methods (e.g., air or gas impingement).

Although coating without using solvent can be preferred, block copolymer compositions of the invention can optionally be coated using solvent-based methods. For example, the compositions can be coated by such methods as knife coating, roll coating, gravure coating, rod coating, curtain coating, and air knife coating. Any suitable solvent can be used. Examples of suitable solvents include ethyl acetate, acetone, methyl ethyl ketone, and combinations thereof. After coating, the composition can be dried to remove solvent. The coated composition can be subjected to increased temperatures, such as those supplied by an oven, to expedite drying of the adhesive.

The block copolymers, melt-processable adhesives therefrom and processes herein are exemplified in the following examples. These examples are merely for illustrative purposes only and are not meant to be limiting on the scope of the appended claims. All parts, percentages, ratios, etc. in the examples and the rest of the specification are by weight unless indicated otherwise.

EXAMPLES

| Table of Abbreviations | |
|---|---|
| AA | Acrylic acid |
| IOA | isooctyl acrylate |
| EHA | 2-ethylhexyl acrylate |
| NBA | n-butyl acrylate |
| PET | polyester film of polyethylene terephthalate having a thickness of 38 micrometers (1.5 mils) |
| CHMA | Cyclohexylmethacrylate |
| MMA | Methylmethacrylate |
| IBMA | isobornylmethacrylate |
| TBA | tert-butyl acrylate |
| PHR | Parts per 100 parts of rubber (block copolymer) |
| F105 | Foral 105 rosin ester tackifying resin commercially available from Hercules, Wilmington, Delaware |
| F85 | Foral 85 rosin ester tackifying resin commercially available from Hercules, Wilmington, Delaware |
| R1018 | Regalrez 1018 hydrocarbon tackifying resin commercially available from Eastman Chemical, Kingsport, Tennessee |
| SP553 | Schenectady SP553 terpene tackifying resin commercially available from Schenectady International, Schenectady, NY |
| BLUE X | Blueminster X rosin ester tackifying resin commercially available from Blueminster Ltd., Kemsing Sevenoaks, Kent, UK |

-continued

Table of Abbreviations

| | |
|---|---|
| WINGTACK PLUS | Synthetic tackifier commercially available from Goodyear, Akron, Ohio |
| KRATON D1107 | Block copolymer commercially available from Kraton Polymers, Houston, TX |

Test Methods

180° Peel Adhesion

This peel adhesion test is similar to the test method described in ASTM D 3330-90, substituting a glass or polyethylene (PE) substrate for the stainless steel substrate described in the test.

Adhesive coatings on polyester film were cut into 1.27 centimeter by 15 centimeter strips. Each strip was then adhered to a 10 centimeter by 20 centimeter clean, solvent washed glass coupon using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 0.3 meters/minute (12 inches/minute) over a five second data collection time. Two samples were tested; the reported peel adhesion value is an average of the peel adhesion value from each of the two samples. Additionally, samples were allowed to dwell at constant temperature and humidity conditions for 24 hours and then were tested for 180° peel adhesion.

Shear Strength

This shear strength test is similar to the test method described in ASTM D 3654-88.

Adhesive coatings on polyester film were cut into 1.27 centimeter (0.5 inch) by 15 centimeter (6 inch) strips. Each strip was then adhered to a stainless steel panel such that a 1.27 centimeter by 1.27 centimeter portion of each strip was in firm contact with the panel and one end portion of the tape being free. The panel with coated strip attached was held in a rack such that the panel formed an angle of 178° with the extended tape free end, which was tensioned by application of a force of one kilogram applied as a hanging weight from the free end of the coated strip. The 2° less than 180° was used to negate any peel forces, thus ensuring that only shear strength forces were measured, in an attempt to more accurately determine the holding power of the tape being tested. The time elapsed for each tape example to separate from the test panel was recorded as the shear strength. All shear strength failures (if the adhesive failed at less than 10,000 minutes) reported herein were adhesive failures (i.e. no adhesive residue was left on the panel) unless otherwise noted. Each test was terminated at 10,000 minutes, unless the adhesive failed at an earlier time (as noted).

Quick Stick Test

Quick Stick tests were carried out according to the AFERA 4015 test method.

Dynamic Mechanical Analysis

Elastomers were tested by Dynamic Mechanical Analysis (DMA) in a parallel plate rheometer (RDA II, Rheometrics, Inc; Piscataway, N.J.) while the sample was heated from room temperature to 200° C. at a rate of 2° C./minute, a frequency of 1 radian/second, and a maximum strain of 10% to determine the rubbery plateau and the "crossover temperature". The crossover temperature is the highest temperature point where the G' and G" curves intersect or the highest temperature point where tangent delta =1.

Examples 1–5

A series of polymers of the ABA block copolymer type were prepared with an approximate 60/40 ratio of CHMA/MMA in the A blocks and poly-IOA of about 170,000 molecular weight in the B block (actual values are shown in Table 1). The preparation of each polymer was carried out using anionic polymerization techniques in a 3 step synthesis.

Step 1: Preparation of Poly-t-butylacrylate Macro-initiator

In a glass vessel dried and purged with nitrogen was added THF, LiCl, naphtalene/α-methylstyrene and a solution of sec-butyl lithium in cyclohexane. The solution was cooled to −78° C. and TBA was added. Polymerization was allowed to proceed for about one hour at −78° C., so complete conversion of the TBA was obtained.

Step 2: Preparation of CHMA/MMA-TBA-CHMA/MMA Block Copolymer

To the difunctional polyTBA initiator prepared in Step 1 was added the CHMA and MMA monomers in the desired ratio. Polymerization was allowed to proceed for about one hour at −78° C., so all the monomers were essentially depleted. The reaction was then quenched with methanol, the polymer precipitated with a 90/10 mixture of water/methanol and dried under vacuum overnight.

Step 3: Conversion to CHMA/MMA-IOA-CHMA/MMA Block Copolymer

The B-block of the polymer isolated in Step 2 was converted to poly-IOA by trans-esterification. The trans-esterification was carried out by refluxing the polymer in isooctanol for about 10–12 hours in the presence of 10 mol % (based on TBA units only) of para-toluenesulfonic acid. NMR testing confirmed the conversion of TBA to IOA and that no trans-esterification of the CHMA or MMA had occurred. The polymers produced are described in Table 1.

TABLE 1

| Example | Polymer Description | A Block Molecular Weight and Ratio of CHMA/MMA | B Block Molecular Weight |
|---|---|---|---|
| 1 | CHMA/MMA-IOA-CHMA/MMA | 8,000 60/40 | 180,000 |
| 2 | CHMA/MMA-IOA-CHMA/MMA | 10,000 60/40 | 170,000 |
| 3 | CHMA/MMA-IOA-CHMA/MMA | 13,000 65/35 | 170,000 |
| 4 | CHMA/MMA-IOA-CHMA/MMA | 15,000 57/43 | 160,000 |
| 5 | CHMA/MMA-IOA-CHMA/MMA | 21,000 60/40 | 170,000 |

Examples 6–7

The same procedure used to prepare Examples 1–5 was used to prepare Examples 6–7 except that the ratio of CHMA/MMA in the A Block was varied as shown in Table 2.

TABLE 2

| Example | Polymer Description | A Block Molecular Weight and Ratio of CHMA/MMA | B Block Molecular Weight |
|---|---|---|---|
| 6 | CHMA/MMA-IOA-CHMA/MMA | 10,000 35/65 | 170,000 |

TABLE 2-continued

| Example | Polymer Description | A Block Molecular Weight and Ratio of CHMA/MMA | B Block Molecular Weight |
|---|---|---|---|
| 7 | CHMA/MMA-IOA-CHMA/MMA | 18,000 15/85 | 170,000 |

Examples 8–9

A series of polymers of the ABA block copolymer type were prepared with differing ratios of IBMA/MMA in the A blocks with a molecular weight of about 8,000 and poly-IOA of about 70,000 molecular weight in the B block. The preparation of each polymer was carried out using atom transfer polymerization techniques in a 2 step synthesis.

Step 1: Preparation of poly-isooctylacrylate Macro-initiator

In a glass vessel dried and purged with nitrogen was added toluene, diethylmeso-2,5-dibromoadipate/CuCl difunctional initiator and isooctyl acrylate monomer. The reaction was run at 85° C. for about 24 hours so the isooctylacrylate monomer conversion was near 100%.

Step 2: Preparation of IBMA/MMA-IOA-IBMA/MMA Block Copolymer

To the difunctional poly-IOA initiator prepared in Step 1 was added the IBMA and MMA monomers in the desired ratio, while keeping the vessel inerted. Polymerization was allowed to proceed for about 24 hours at 85° C. The reaction was then quenched by exposure to oxygen and cooling. To remove most of the copper catalyst, the sample is filtered through a short silica column. The polymer can be recovered by precipitation in methanol or the solvent can be removed by evaporation. The summary properties of the polymers are shown in Table 3.

TABLE 3

| Example | Polymer Description | A Blocks Molecular Weight and Ratio of IBMA/MMA | B Block Molecular Weight |
|---|---|---|---|
| 8 | IBMA/MMA-IOA-IBMA/MMA | 8,000 30/70 | 70,000 |
| 9 | IBMA/MMA-IOA-IBMA/MMA | 8,000 70/30 | 70,000 |

Example 10

The same procedure used to prepare Examples 1–5 was used to prepare Example 10 except that the molecular weight of the B Block was about 210,000, the molecular weight of the A block was about 25,000 and the ratio of CHMA/MMA was 80/20.

Examples 11–25 and Comparative Examples C1–C3

Several of the polymer samples described above were combined with tackifying resin. The block copolymer and tackifying resin amounts are given in Table 4 (the parts by weight of tackifying resins were added in to 100 parts by weight of block copolymer). The resulting compositions were dissolved in toluene to form 30–40 weight percent solids solutions and knife coated on PET film. The coatings were dried in an oven at 70° C. for 15 minutes and conditioned in a constant temperature (25 degrees Celsius) and humidity 20 room (50% relative humidity) for 24 hours before testing. Adhesive testing was carried out according to the test methods listed above and the results are shown in Table 5. Additionally, comparative adhesives were prepared and tested according to the same procedure. Comparative Example C1 is a 95.5/4.5 IOA/AA copolymer with inherent viscosity (measured in ethylacetate at 27° C.) of about 1.6 dl/g. Comparative Example C2 is a 90/10 IOA/AA copolymer with inherent viscosity (measured in ethylacetate at 27° C.) of about 1.85 dl/g. Comparative Example C3 was prepared by dissolving 100 parts by weight of Kraton D1107 at about 35% solids in toluene. To this solution, 100 parts by weight of Wingtack Plus are added and the mixture is allowed to agitate to form a homogenous solution for coating. The results for adhesive testing is presented in Table 5.

TABLE 4

| Example | Polymer Example | F105 (PHR) | F85 (PHR) | R1018 (PHR) | SP553 (PHR) | BLUE X (PHR) |
|---|---|---|---|---|---|---|
| 11 | 3 | — | 81.8 | 18.2 | — | — |
| 12 | 3 | 41 | — | 9 | — | — |
| 13 | 3 | — | 101 | 21.5 | — | — |
| 14 | 5 | 79 | — | — | — | 43.3 |
| 15 | 5 | 23.2 | 23.2 | 3.6 | — | — |
| 16 | 5 | 32.4 | — | 67.6 | — | — |
| 17 | 5 | — | — | — | 31.8 | 68.2 |
| 18 | 10 | — | 86.5 | 35.7 | — | — |
| 19 | 1 | — | 95.5 | 35.7 | — | — |
| 20 | 1 | 45.3 | — | 4 | — | — |
| 21 | 2 | — | 93.9 | 28.3 | — | — |
| 22 | 2 | 44.1 | — | 5.2 | — | — |
| 23 | 4 | — | 89.4 | 32.8 | — | — |
| 24 | 4 | 41.3 | — | 7.9 | — | — |
| 25 | 5 | — | 86.0 | 36.2 | — | — |

TABLE 5

| Example | Polymer Example | 180° peel from glass (N/dm) | 180° peel from PE (N/dm) | Shear Strength (minutes) | Quick Stick (N/cm) |
|---|---|---|---|---|---|
| 11 | 3 | 61.8 | 49.0 | NM | 1.91 |
| 12 | 3 | 46.2 | 48.6 | NM | 2.68 |
| 13 | 3 | 74.8 | 63.5 | 1,197 | 1.25 |
| 14 | 5 | 50.4 | 53.5 | NM | 0.61 |
| 15 | 5 | 49.4 | 45.1 | 2,748 | 3.31 |
| 16 | 5 | 38.1 | 19.0 | 265 | 2.15 |
| 17 | 5 | 50.0 | 21.9 | 10,000 | 2.62 |
| 18 | 10 | 85.3 | 63.5 | 19 | 3.68 |
| 19 | 1 | 65.4 | 51.9 | 29 | 3.73 |
| 20 | 1 | 43.2 | 38.6 | 241 | 2.50 |
| 21 | 2 | 68.5 | 40.9 | 328 | 3.63 |
| 22 | 2 | 46.8 | 26.5 | 6,200 | 3.17 |
| 23 | 4 | 56.3 | 48.7 | 868 | 4.13 |
| 24 | 4 | 33.7 | 32.2 | 465 | 2.94 |
| 25 | 5 | 57.1 | 25.2 | 1,065 | 2.49 |
| C1 | C1 | 20.6 | 11.8 | 81 | 1.67 |
| C2 | C2 | 45.5 | 3.3 | 382 | 1.26 |
| C3 | C3 | 54.7 | 27.4 | 10,000 | 2.52 |

NM = Not Measured

Examples 26–27

The same procedure used to prepare Examples 1–5 was used to prepare Examples 26–27 except that in Example 26 isooctyl alcohol was used in Step 3 and in Example 27 n-butanol was used in Step 3 to give B blocks of poly-IOA or poly-NBA respectively. The polymers are described in Table 6.

TABLE 6

| Example | Polymer Description | A Block Molecular Weight and Ratio of CHMA/MMA | B Block Molecular Weight |
|---|---|---|---|
| 26 | CHMA/MMA-IOA-CHMA/MMA | 21,000 60/40 | 190,000 |
| 27 | CHMA/MMA-NBA-CHMA/MMA | 21,000 60/40 | 130,000 |

Examples 28–30

Adhesive formulations were prepared from the polymers prepared in Examples 26–27 as described for Examples 11–25 using the reagents listed in Table 7. Adhesive testing was carried out using the test methods described above and the results are shown in Table 8.

TABLE 7

| Example | Polymer Example | F105 (PHR) | F85 (PHR) | R1018 (PHR) | SP553 (PHR) | BLUE X (PHR) |
|---|---|---|---|---|---|---|
| 28 | 26 | 87.5 | — | 34.8 | — | — |
| 29 | 26 | — | — | — | 35.0 | 87.2 |
| 30 | 27 | — | — | — | 21.3 | 100.2 |

TABLE 8

| Example | Polymer Example | 180° peel from glass (N/dm) | 180° peel from PE (N/dm) | Shear Strength (minutes) | Quick Stick (N/cm) |
|---|---|---|---|---|---|
| 28 | 26 | 65.6 | 51.4 | 169 | 2.94 |
| 29 | 26 | 53.6 | 43.8 | 2 | 2.90 |
| 30 | 27 | 33.9 | 37.2 | 1 | 2.30 |

Examples 31–32 and Comparative Examples C4–C5

The same procedure used to prepare Examples 1–5 was used to prepare Examples 31–32 with the ratio of CHMA/MMA in the A Block and the identity and molecular of the B Block as shown in Table 9. Comparative Examples C4 and C5 were prepared similarly only with only MMA (Comp.Ex. C4) and CHMA (Comp. Ex. C5) as the A Block monomer.

TABLE 9

| Example | A Block Molecular Weight, Monomers and Monomer Ratio | B Block Molecular Weight and Monomer |
|---|---|---|
| C4 | 4,000, MMA 100 | 40,000, IOA |
| 31 | 4,000, MMA/CHMA 67/33 | 40,000, IOA |
| 32 | 4,000, MMA/CHMA 33/67 | 40,000, IOA |
| C5 | 4,000, CHMA 100 | 40,000, IOA |

Examples 33–34 and Comparative Examples C6–C7

The same procedure used to prepare Examples 1–5 was used to prepare Examples 33–34 with the ratio of CHMA/MMA in the A Block and the identity and molecular weight of the B Block as shown in Table 10. Comparative Examples C6 and C7 were prepared similarly only with only MMA or CHMA as the A Block monomer.

TABLE 10

| Example | A Block Molecular Weight, Monomers and Monomer Ratio | B Block Molecular Weight and Monomer |
|---|---|---|
| C6 | 10,000, MMA 100 | 100,000, IOA |
| 33 | 10,000, MMA/CHMA 70/30 | 100,000, IOA |
| 34 | 10,000, MMA/CHMA 30/70 | 100,000, IOA |
| C7 | 10,000, CHMA 100 | 100,000, IOA |

Examples 35–37 and Comparative Examples C8–C9

A series of polymers of the ABA block copolymer type were prepared with differing ratios of CHMA/MMA in the A blocks with a molecular weight of about 8,160 and poly-2-EHA of about 120,000 molecular weight in the B block. The preparation of each polymer was carried out using atom transfer radical polymerization technique in a 2 step synthesis.

Step 1: Preparation of Poly-2-ethylhexyl Acrylate Macro-initiator

In a glass vessel dried and purged with nitrogen was added 2-ethylhexyl acrylate as the monomer, diethylmeso-2,5-dibromoadipate as the difunctional initiator, and CuBr complexed by tris[2-(dimethylamino)ethyl]amine as the catalyst. The reaction was run at 60° C. for about 24 hours so the 2-ethylhexyl acrylate monomer conversion was near 100%.

Step 2: Preparation of CHMA/MMA-EHA-CHMA/MMA Block Copolymer

The difunctional poly-2-EHA macro-initiator prepared in Step 1 was diluted with butyl acetate. Then, while keeping the vessel inerted, a solution of the catalyst (CuCl complexed by 1,1,4,7,10,10-hexamethyltriethylenetetramine), dissolved in methyl methacrylate and cyclohexyl methacrylate in the desired ratio, together with a small amount of methyl ethyl ketone, was added. Polymerization was allowed to proceed for about 24 hours at 90° C. The reaction was then quenched by exposure to oxygen and cooling. To remove most of the copper catalyst, the sample is filtered through a short silica column. The polymer can be recovered by precipitation in methanol or the solvent can be removed by evaporation. The summary properties of the polymers are shown in Table 11. Comparative Examples C8 and C9 were prepared similarly only with only MMA (Comp. Ex. C8) and CHMA (Comp. Ex. C9) as the A Block monomer.

TABLE 11

| Example | A Block Molecular Weight, Monomers and Monomer Ratio | B Block Molecular Weight and Monomer |
|---|---|---|
| C8 | 8,160, MMA 100 | 120,000, EHA |
| 35 | 8,160, MMA/CHMA 75/25 | 120,000, EHA |
| 36 | 8,160, MMA/CHMA 50/50 | 120,000, EHA |
| 37 | 8,160, MMA/CHMA 25/75 | 120,000, EHA |
| C9 | 8,160, CHMA 100 | 120,000, EHA |

Examples 38–39

The same procedure used to prepare Examples 1–5 was used to prepare Examples 38–39 with the ratio of CHMA/MMA in the A Block and the identity and molecular weight of the B Block as shown in Table 12.

TABLE 12

| Example | A Block Molecular Weight, Monomers and Monomer Ratio | B Block Molecular Weight and Monomer |
|---|---|---|
| 38 | 21,000, MMA/CHMA 40/60 | 190,000, IOA |
| 39 | 21,000, MMA/CHMA 40/60 | 190,000, BA |

Examples 40–41

The same procedure used to prepare Examples 1–5 was used to prepare Examples 40–41 with the ratio of CHMA/Styrene in the A Block and the identity and molecular weight of the B Block as shown in Table 13.

TABLE 13

| Example | A Block Molecular Weight, Monomers and Monomer Ratio | B Block Molecular Weight and Monomer |
|---|---|---|
| 40 | 7,400, Styrene/CHMA 55/45 | 120,000, IOA |
| 41 | 8700, Styrene/CHMA 30/70 | 120,000, IOA |

Examples 42–43

The same procedure used to prepare Examples 8–9 was used to prepare Examples 42–43 with the ratio of IBMA/MMA in the A Block and the identity and molecular weight of the B Block as shown in Table 14.

TABLE 14

| Example | A Block Molecular Weight, Monomers and Monomer Ratio | B Block Molecular Weight and Monomer |
|---|---|---|
| 42 | 8,000, MMA/IBMA 70/30 | 70,000, IOA |
| 43 | 8,000, MMA/IBMA 30/70 | 70,000, IOA |

Example 44

Dynamical Mechanical Testing was carried out on some of the polymer samples using the test method described above. The crossover temperature was determined as the point where G' and G" curves intersect or when Tangent delta=1 in the flow region of the viscoelastic curve. The rubbery plateau range when determined and the crossover temperature are presented in Table 15.

TABLE 15

| Example | Polymer Example | A Block Molecular Weight, Monomers and Ratio | B Block Molecular Weight and Monomer | Rubbery Plateau (° C.) | Cross-over Temperature (° C.) |
|---|---|---|---|---|---|
| 44A | C4 | 4,000 - MMA 100 | 40,000, IOA | 10–125 | 170 |
| 44B | 31 | 4,000, MMA/CHMA 67/33 | 40,000, IOA | 10–80 | 100 |
| 44C | 32 | 4,000, MMA/CHMA 33/67 | 40,000, IOA | 10–35 | 50 |
| 44D | C5 | 4,000, CHMA 100 | 40,000, IOA | none | 40 |
| 44E | C6 | 10,000, MMA 100 | 100,000, IOA | NA | >240 |
| 44F | 33 | 10,000, MMA/CHMA 70/30 | 100,000, IOA | 10–160 | 220 |
| 44G | 34 | 10,000, MMA/CHMA 30/70 | 100,000, IOA | 10–160 | 190 |
| 44H | C7 | 10,000, CHMA 100 | 100,000, IOA | 20–70 | 90 |
| 44I | C8 | 12,000, MMA 100 | 120,000, EHA | 0–100 | 170 |
| 44J | 35 | 12,000, MMA/CHMA 75/25 | 120,000, EHA | 0–80 | 104 |
| 44K | 36 | 12,000, MMA/CHMA 50/50 | 120,000, EHA | 0–50 | 71 |
| 44L | 37 | 12,000, MMA/CHMA 25/75 | 120,000, EHA | 0–25 | 48 |
| 44M | C9 | 12,000, CHMA 100 | 120,000, EHA | None | 36 |
| 44N | 38 | 21,000, MMA/CHMA 40/60 | 190,000, IOA | 10–130 | 160 |
| 44O | 39 | 21,000, MMA/CHMA 40/60 | 190,000, BA | 30–80 | 100 |
| 44P | 40 | 7400, Styrene/CHMA 55/45 | 120,000, IOA |  | 170 |
| 44Q | 41 | 8700, Styrene/CHMA 30/70 | 120,000, IOA |  | 130 |
| 44R | 42 | 8,000, MMA/IBMA 70/30 | 70,000, IOA | 10–110 | 130 |
| 44S | 43 | 8,000, MMA/CHMA 30/70 | 70,000, IOA | None | NA |

What is claimed is:

1. A method of preparing a poly(meth)acrylate block copolymer, having meltflow temperature in the range from 50° C. to 250° C., the method comprising:

reacting at least one low glass transition temperature polymeric block and at least one high glass transition temperature copolymeric end block comprising first monomeric units and second monomeric units to form the block copolymer, wherein the low glass transition temperature polymeric block has a glass transition temperature of less than about 20° C., and the high glass transition temperature copolymeric end block has a glass transition temperature of at least about 20° C., and selecting the second monomeric units to increase or decrease meltflow temperature of the block copolymer compared to a block copolymer that is otherwise similar but does not contain the second monomeric units, wherein at least one of the low glass transition temperature polymeric block and the high glass transition temperature copolymeric end block is derived from one or more (meth)acrylate monomer.

2. The method of claim 1 wherein the block copolymer has a cohesive strength of at least 5,000 minutes measured according to ASTM D 3654.

3. The method of claim 1 comprising selecting the second monomeric units to decrease meltflow temperature of the block copolymer compared to a block copolymer that is otherwise similar but does not contain the second monomeric units, wherein the block copolymer has a cohesive strength of at least 10,000 minutes measured according to ASTM D 3654.

4. The method of claim 1 wherein the copolymer comprises high glass transition temperature copolymeric end block having a glass transition temperature of the copolymeric block between 20° C. to 200° C.

5. The method of claim 1 comprising selecting the second monomeric units to desirably increase meltflow temperature of the block copolymer compared to a block copolymer that is otherwise similar but does not contain the second monomeric units, wherein the block copolymer has a cohesive strength of at least 10,000 minutes measured according to ASTM D 3654.

6. The method of claim 5 wherein the copolymer comprises copolymeric end blocks having a glass transition temperature of from 20° C. to 200° C.

7. The method of claim 5 wherein the copolymer comprises copolymeric end blocks having a glass transition temperature of the copolymeric block from 100° C. to 200° C.

8. The method of claim 1 wherein end block copolymer comprises first monomeric units selected from the group consisting of linear and branched alkyl(meth)acrylates, cycloaliphatic monomeric units, and aromatic monomeric units, and second monomeric units selected from the group consisting of cycloaliphatic and aromatic monomeric units.

9. The method of claim 1 wherein end block copolymer comprises first monomeric units selected from the group consisting of linear and branched alkyl(meth)acrylates, and second monomeric units selected from the group consisting of cycloaliphatic and aromatic monomeric units.

10. The method of claim 9 wherein the first monomeric unit is methyl methacrylate, and the second monomeric unit is selected from the group consisting of benzyl acrylate, benzyl methacrylate, cyclohexyl acrylate, cyclohexyl methacrylate, isobornyl acrylate, isobornyl methacrylate, phenylacrylate, phenyl methacrylate, phenethyl acrylate, phenethyl methacrylate, 2-naphthyl acrylate, 2-naphthyl methacrylate, adamantyl acrylate, adamantyl methacrylate, styrene, alpha-methylstyrene, and t-butylstyrene.

11. The method of claim 8 wherein the method is used to prepare a pressure sensitive adhesive composition comprising the block copolymer.

12. The method of claim 11 wherein the pressure sensitive adhesive composition comprises tackifier.

13. The method of claim 11 further comprising the step of crosslinking the pressure sensitive adhesive composition.

14. The method of claim 11 wherein the pressure sensitive adhesive composition comprises 10 to 200 parts by weight tackifier based on 100 parts by weight block copolymer.

15. The method of claim 11 wherein the pressure sensitive adhesive composition comprises plasticizer.

16. The method of claim 11 wherein the pressure sensitive adhesive composition comprises tackifier and plasticizer.

17. The method of claim 11 wherein the composition is a pressure sensitive adhesive having a cohesive strength of at least 2,000 minutes measured according to ASTM D 3654.

18. A melt-processable poly(meth)acrylate block copolymer, the block copolymer comprising at least one high glass transition temperature copolymeric end block having a glass transition temperature of at least about 20° C., and at least one low glass transition temperature polymeric block having a glass transition temperature of less than about 20° C., wherein high glass transition temperature copolymeric end block comprises first monomeric units and second monomeric units, the second monomeric units increasing or decreasing meltflow temperature of the block copolymer compared to a similar block copolymer that does not contain the second monomeric units, wherein at least one of the high glass transition temperature copolymeric end block and the low glass transition temperature polymeric block is derived from one or more (meth)acrylate monomer, and the meltflow temperature of the block copolymer is in the range from 50° C. to 250° C.

19. The block copolymer of claim 18 wherein the second monomeric unit increases the meltflow temperature of the block copolymer relative to a similar block copolymer having end blocks of the homopolymeric first monomeric units.

20. The block copolymer of claim 18 wherein the second monomeric unit decreases the meltflow temperature of the block copolymer relative to a similar block copolymer having end blocks of homopolymeric first monomeric units.

21. The block copolymer of claim 18 wherein the block copolymer is a pressure sensitive adhesive having a cohesive strength of at least 2,000 minutes measured according to ASTM D 3654.

22. The block copolymer of claim 18 comprising first monomeric units selected from the group consisting of linear and branched alkyl(meth)acrylates, and second monomeric units selected from the group consisting of cycloaliphatic and aromatic monomeric units.

23. The block copolymer of claim 18 wherein the first monomeric unit is methyl methacrylate, and the second monomeric unit is selected from the group consisting of benzyl acrylate, benzyl methacrylate, cyclohexyl acrylate, cyclohexyl methacrylate, isobornyl acrylate, isobornyl methacrylate, phenylacrylate, phenyl methacrylate, phenethyl acrylate, phenethyl methacrylate, 2-naphthyl acrylate, 2-naphthyl methacrylate, adamantyl acrylate, adamantyl methacrylate, styrene, alpha-methylstyrene, and t-butylstyrene.

24. A melt processable, thermoplastic poly(meth)acrylate block copolymer comprising
   at least one soft polymeric block having a glass transition temperature of less than about 20° C., and
   at least two hard copolymeric end blocks having a glass transition temperature of from 20° C. to 200° C. and comprising
      first monomeric units selected from the group consisting of linear and branched alkyl(meth)acrylates, cycloaliphatic monomeric units, and aromatic monomeric units, and
      second monomeric units selected from the group consisting of cycloaliphatic monomeric units, aromatic monomeric units, and low glass transition temperature linear or branched alkyl acrylate or alkyl methacrylate monomeric units, and
   wherein the block copolymer has a meltflow temperature in the from 50° C. to 250° C.

25. The copolymer of claim 24 wherein end block copolymer comprises
   first monomeric units selected from the group consisting of linear and branched alkyl(meth)acrylates, and
   second monomeric units selected from the group consisting of cycloaliphatic and aromatic monomeric units.

26. The copolymer of claim 25 wherein the first monomeric unit is methyl methacrylate, and the second monomeric unit is selected from the group consisting of benzyl acrylate, benzyl methacrylate, cyclohexyl acrylate, cyclohexyl methacrylate, isobornyl acrylate, isobornyl methacrylate, phenylacrylate, phenyl methacrylate, phenethyl acrylate, phenethyl methacrylate, 2-naphthyl acrylate, 2-naphthyl methacrylate, adamantyl acrylate, adamantyl methacrylate, styrene, alpha-methylstyrene, and t-butylstyrene.

27. A melt processable, thermoplastic block copolymer comprising
   at least one soft polymeric block having a glass transition temperature of less than about 20° C., and
   at least two hard copolymeric end blocks having a glass transition temperature of from 20° C. to 200° C. and comprising
      first monomeric units selected from the group consisting of ethylenically unsaturated polymerizable cycloaliphatic monomeric units, and
      second monomeric units selected from the group consisting of ethylenically unsaturated polymerizable aromatic monomeric units, and
   wherein the block copolymer has a meltflow temperature in the range from 50° C. to 250° C.

* * * * *

UNITED STATES PATENT AND TRADEMARK OFFICE
CERTIFICATE OF CORRECTION

PATENT NO. : 6,806,320 B2
DATED : October 19, 2004
INVENTOR(S) : Everaerts, Albert It is certified that error appears in the above-identified patent and that said Letters Patent is hereby corrected as shown below:

Column 2,
Line 39, delete "$\tan f$" and insert -- $\tan \partial$ --, therefore.

Column 4,
Line 23, delete "he" and insert -- be --, therefore.

Column 5,
Line 9, delete "isobomylmethacrylate" and insert -- isobornylmethacrylate --, therefore.
Line 21, after "copolymer" delete ",".

Column 19,
Line 26, delete "lime" and insert -- time --, therefore.

Column 21,
Line 67, after "humidty" delete "20".

Column 23,
Line 44, after "molecular" insert -- weight --.

Signed and Sealed this

Eighteenth Day of October, 2005

JON W. DUDAS
*Director of the United States Patent and Trademark Office*